April 17, 1962 H. MULCH 3,029,692
SLIDE PROJECTOR
Filed Aug. 13, 1958 4 Sheets-Sheet 1

INVENTOR.
HANS MULCH
BY Toulmin & Toulmin
ATTORNEYS

April 17, 1962 H. MULCH 3,029,692
SLIDE PROJECTOR
Filed Aug. 13, 1958 4 Sheets-Sheet 3

INVENTOR.
HANS MULCH
BY Toulmin & Toulmin
ATTORNEYS

April 17, 1962 H. MULCH 3,029,692
SLIDE PROJECTOR
Filed Aug. 13, 1958 4 Sheets-Sheet 4
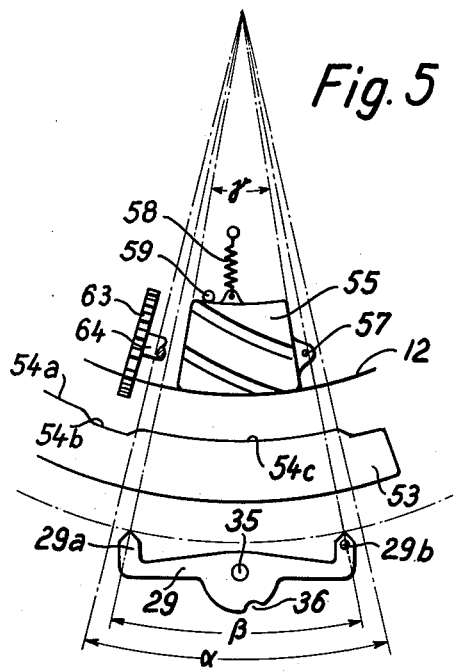
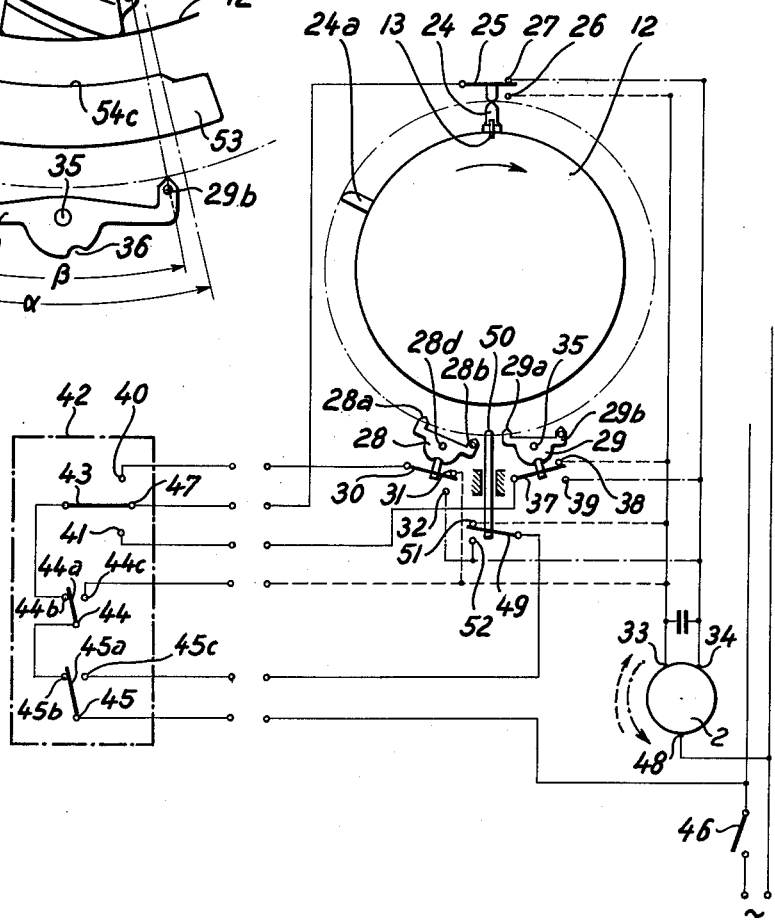
INVENTOR.
HANS MULCH
BY Toulmin & Toulmin
ATTORNEYS United States Patent Office 3,029,692
Patented Apr. 17, 1962

3,029,692
SLIDE PROJECTOR
Hans Mulch, Wetzlar (Lahn), Germany, assignor to Ernst Leitz G.m.b.H., Optische Werke, Wetzlar (Lahn), Germany
Filed Aug. 13, 1958, Ser. No. 754,809
Claims priority, application Germany Aug. 19, 1957
11 Claims. (Cl. 88—28)

The present invention relates to a projector for slides or transparencies. More in particular, the present invention relates to a projector for slides or transparencies with cooling means and electro-mechanical slide changing means.

It is known to equip projectors with cooling means consisting of a ventilator driven by an electric motor. Another, separate electric motor is required as driving means for the slide changing mechanism. It is also known to equip these projectors with remote control means.

A complete slide changing operation can be performed with these projectors comprising the removal of a slide from the viewing position, advancing of the magazine a distance equal to the space between adjacent slides, and transferring a new slide to the viewing position.

It is also possible to effect an incomplete slide changing operation whereby only the slide is advanced to the viewing position or is returned to the magazine.

According to another known construction the driving means consists of a lifting magnet instead of an electric motor.

These known constructions suffer from the disadvantage that they require two separate driving means for the cooling mechanism and the slide changing mechanism, e.g. two electric motors or an electric motor and a lifting magnet. Furthermore, the slide changing operation effected by these known projectors suffers from a lack of versatility as the magazine can be moved in one direction only, usually in forward direction.

It is therefore impossible to automatically show again a slide which had already been shown previously by remote operation, although this is frequently necessary and desirable.

It is an object of the present invention to provide a projector with cooling means and an electro-mechanical, automatic remote controlled slide changing mechanism, which has a more simple construction and which has a greater versatility with respect to the slide changing operation than known constructions.

It is another object of the present invention to provide a projector with cooling means and an electro-mechanical, automatic remote controlled slide changing mechanism, having one common driving means both for the cooling means and the slide changing mechanism.

It is a further object of the present invention to provide a projector with cooling means and an electro-mechanical, automatic remote controlled slide changing mechanism, which makes it possible to show again a slide by automatic, remote controlled operation, a slide which had already been shown previously.

It is a further object of the present invention to provide a projector with cooling means and an electro-mechanical, automatic remote controlled slide changing mechanism, in which the magazine can be moved automatically both in forward and in backward direction.

It is yet another object of the present invention to provide a projector with cooling means and an electro-mechanical, automatic, remote controlled slide changing mechanism, which is capable to effect both a complete slide changing operation comprising the removal of a slide from the viewing position, advancing of the magazine a distance equal to the space between adjacent slides, and transferring a new slide to the viewing position, and an incomplete slide changing operation comprising only the removal of the slide from the viewing position.

It is still another object of the present invention to provide a projector with cooling means and an electro-mechanical, automatic, remote controlled slide changing mechanism, wherein a complete or incomplete slide changing operation can be controlled by remote control means.

These objects, as well as further objects and advantages of the present invention, which will become apparent as the description thereof proceeds, are achieved by the slide projector of the invention comprising only one motor adapted for clockwise as well as counter-clockwise rotation and adapted to impel the ventilator as well as the slide changing and magazine transporting means.

Preferably, the slide changing and magazine transporting means are in communication with the motor via freewheel clutch means.

The invention will be better understood upon the following detailed description of the accompanying drawings wherein FIGURE 1 is a cross-sectional view of the projector with the cooling means and the slide changing mechanism of the present invention;

FIGURE 5 is a top view of a part of the switch and transmission means for the cooling and slide changing mechanism in the projector of the present invention;

FIGURE 6 is a wiring diagram of the electrical circuit and the projector of the present invention.

Figure 1:
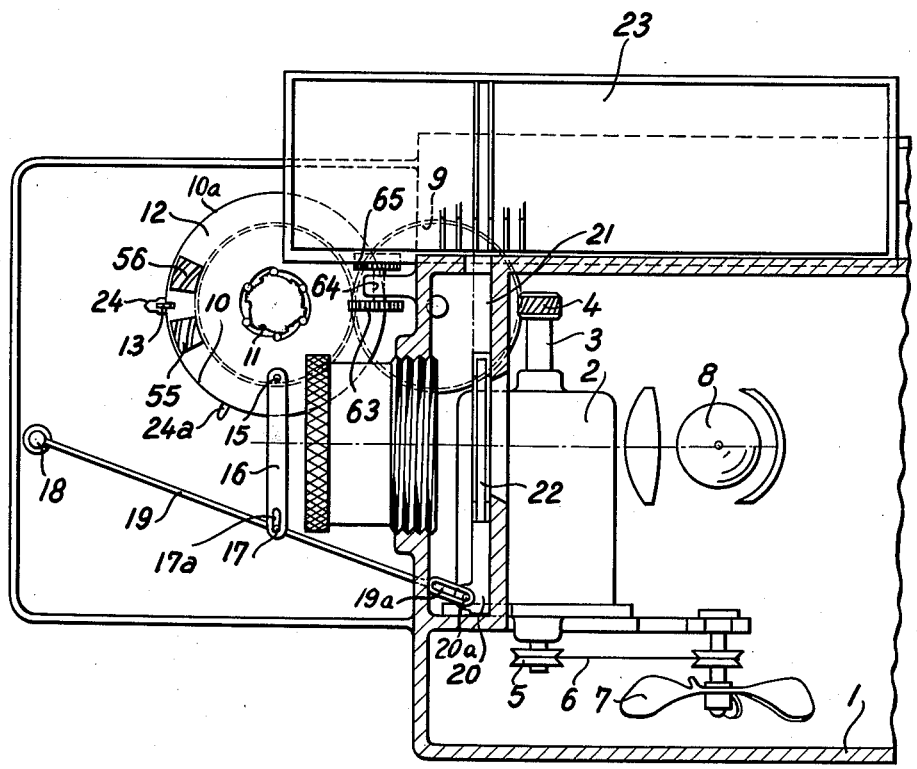

Referring now to the drawings, more in particular to FIGURE 1, the projector of this invention has a casing 1 in which there is mounted an electric motor 2, upon whose axis 3 there is provided a worm gear 4 and a driving wheel 5. This wheel drives the ventilator wheel 7 of the cooling means disposed laterally of lamp 8 via a transmission belt 6.

The worm gear is connected with a transmission gear 9 which is in mesh with a gear 10a mounted on disc 10 of a clutch 11 which drives in only one direction of rotation. The clutch is so adapted that a coupling is effected only in a few predetermined positions of the two coupling discs.

Figure 3:
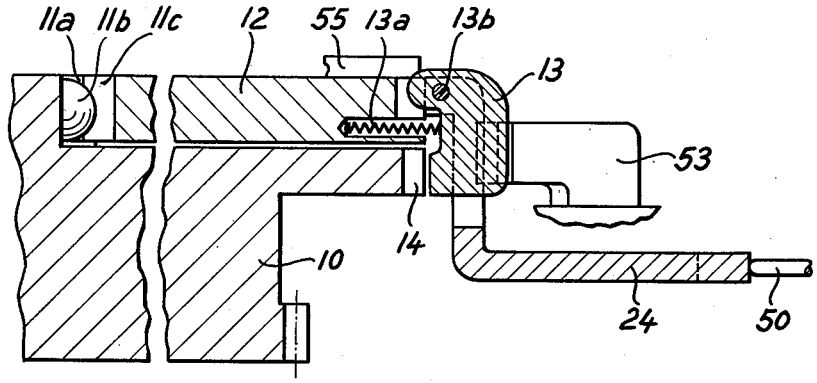
FIGURE 3 is a longitudinal sectional view of portions of the coupling and switch means for the slide changing and cooling mechanism in the projector of the present invention.
Figure 4:
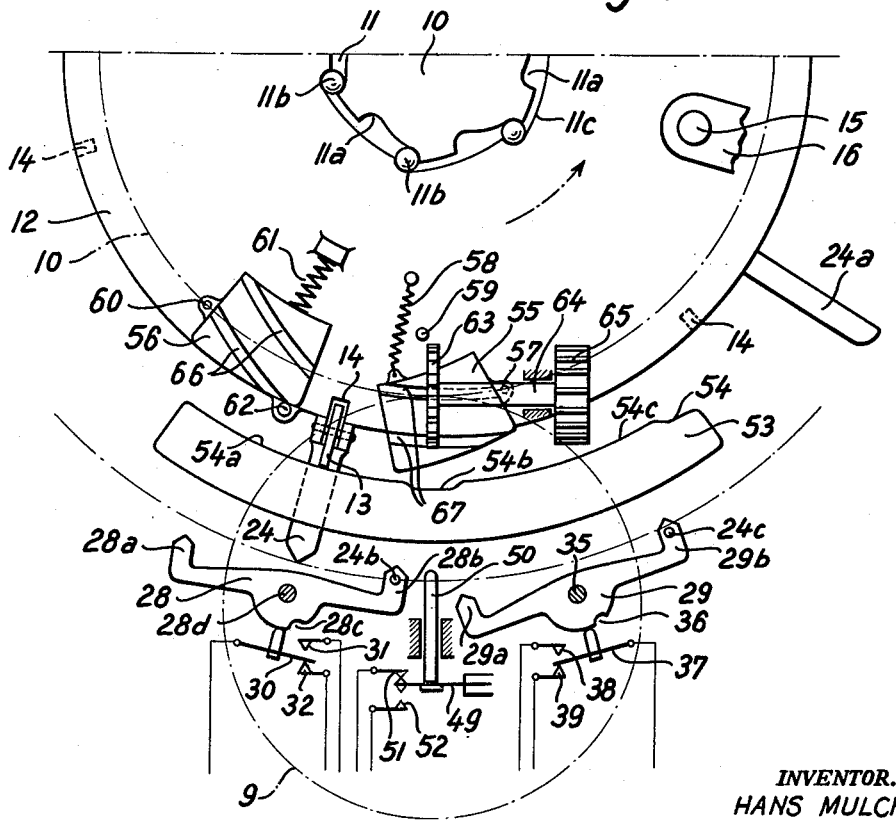
FIGURE 4 is a top view of the freewheel clutch and the switch and transmission means for the cooling and slide changing mechanism in the projector of the present invention.

The disc 10 has six recesses 11a and there are corresponding six recesses 11c in the driven disc 12 with six balls 11b. At its lower edge the disc 12 bears a locking member 13 which is normally in its unlocked position under the influence of spring 13a and which is pivotable about axis 13b (see FIGURE 3). The locking member 13 is adapted to enter one or the other of six recesses 14 in the peripheral rim of disc 10, according to the actual coupling position.

The disc 12 also bears a peg 15 on which is pivotally connected a lever 16. Lever 16 has a slot 17a at the end opposite to the end pivotally mounted on peg 15. Into slot 17a there projects a bolt 17, which latter is mounted on a lever 19 pivotally mounted on a fixed axis 18 (see FIGURE 1). The end of lever 19 opposite to the end mounted on axis 18 is provided with a slot 19a, into which projects a bolt 20a. The latter is mounted on a slide member 20.

If disc 12 turns, the rotary movement of the latter is transformed to a reciprocating movement of lever 19 via lever 16 and the bolt 17 in slot 17a of lever 16.

Via the lever end 17 and a slot 17a in said lever end 17 a lever 19 can be actuated which is pivotable about a fixed axis 18 (see FIGURE 1). The free end of this lever 19 actuates a slide member 20 via bolt 20a in slot 19a. Slide member 20 can be displaced in the slideway 21 thereby bringing a slide 22 into a magazine 23 attached to the projector casing 1.

A cam 24 is mounted on the driven disc 12 on the same radius bearing the locking member 13.

By means of this cam 24 a switch contact blade 25 (see FIGURE 6) can be switched between contact 26 and contact 27.

In addition, the cam 24 actuates two switch rocker arms 28 and 29 which are pivotally mounted at substantially their midpoints.

Figure 2:
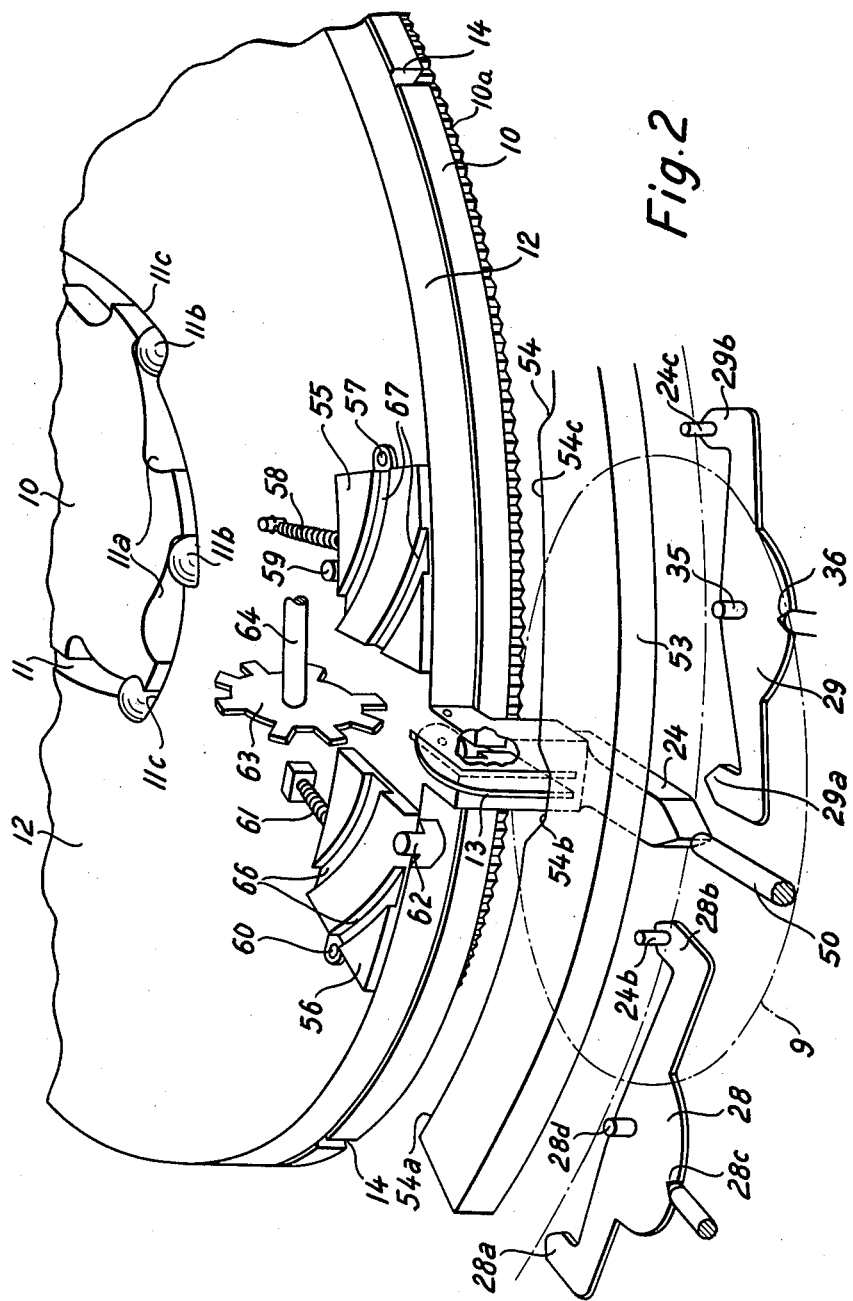
FIGURE 2 is a perspective view of the freewheeling clutch and parts of the slide changing mechanism in the projector of the present invention.

The switch arm 28 has two cam followers 28a and 28b at the ends thereof and a pivot point 28d. The switch arm 28 has a recess 28c (see FIGURE 2), which cooperates with a movable contact 30 (see FIGURE 6) so that the contact 30 can be switched between contact 31 and contact 32.

The switch arm 29 has two cam followers 29a and 29b at the ends thereof.

The arm 29 can be pivoted upon axis 35 at its midpoint and has a recess 36 actuating a movable contact 37 which, in turn, is engageable with stationary contacts 38 and 39.

The cam followers 28b and 29b have mounted thereon bolts 24b and 24c, respectively, projecting into the range of rotation of a nose portion 24a attached projecting radially outwardly of the disc 12.

A control segment 53 is positioned above the contact pin 50 to extend on both sides thereof and within the range of movement of the locking member 13. The inner surface 54 of the control segment 53 functions as a cam and has three different cam surfaces, a, b, and c. The surfaces a, c are adapted to retain the locking member 13 in one of the recesses 14 of the disc 10. In the recessed surface the locking member is allowed to follow up the segment and is no longer retained by the disc 10. Between the various surfaces and at the end of the surface 54c provision is made for a slanted configuration in order to facilitate the scanning operation of the locking member.

The respective lengths of the cam surfaces a and c are so chosen that these surfaces are located within a sector $\alpha$ measured from the axis of disc 12 as a vertex—which is greater than the sector $\beta$ enclosed by the corresponding contact points of the switch arms 28 and 29 (see FIGURE 5).

The last-mentioned sector $\beta$ is, in turn, greater than the sector $\gamma$ in whch is subtended by each of the two control members 55 and 56 mounted upon the disc 12. The two control members are spaced from each other by the same sector as the switch arms 28 and 29.

The control member 55 is pivotally positioned about axis 57 and is urged against a stop 59 by a spring 58. The control member 56 is pivotally positioned about axis 60 and is biased against a stop 52 by spring 61.

Those control members 55 and 56 have guide grooves 66 and 67 controlling the stepping gear 63 and forming together with the latter a step switching mechanism.

The stepping gear 63 is positioned on the same radian supporting the contact pin 50 and the cam surface 54c of the control segment 53. The stepping gear 63 is mounted on an axis 64 which is positioned in the casing 1 of the projector and which supports another gear 65 meshing a rack of the magazine 23 in a known manner.

The control circuit, as illustrated in FIGURE 6 of the drawings and used in the operation of the slide projector of this invention, will next be described. The slide projector is controlled from a remote control box 42 which comprises the following controls:

43—for advancing the magazine without introducing a new slide but removing the slide from the magazine, the magazine being movable in both directions.

44—for singly changing slides with the magazine moving a single step.

45—for removing the slide from the magazine without moving of the magazine.

The control circuit is energized from a source of electrical energy from which extend two lines, M and N, with there being a line switch 46 in the line M. A reversible motor 3 has a terminal 48, which is connected to the line N and terminals 33 and 34 which are connected to a control circuit to the line M which constitutes the other side of the source of electric energy. Either terminal 33 or 34 is connected to the power line and the connection of these terminals determines the direction of rotation of the motor 3.

Electrical leads extending from the motor terminals 33 and 34 are connected to stationary contacts 26 and 27 respectively. There is a movable contact arm 25 engageable with the stationary contacts 26 and 27. The movable contact arm 25 is actuated by the projection 24 on the disc 12. The movable contact arm 25 is connected to a stationary contact 47 of a control box 42. The contact 47 and stationary contacts 40 and 41 are engageable by a control switch 43 which is, in effect, a movable contact arm. The movable contact arm 43 is connected to a stationary contact 44b, which together with a stationary contact 44c, are engageable by a movable contact arm 44a, which is a control switch for changing slides. Said control switch is normally in contact with the stationary contact 44b.

The movable contact arm 44a is connected to a stationary contact 44, which is in turn connected to a stationary contact 45b, which together with a stationary contact 45c is engageable with a movable contact arm 45a which constitutes a control switch for moving slides from the magazine without moving of the magazine.

The movable contact arm 45a is connected to a contact 45, which in turn is connected to the line M; i.e., the other side of the source of electric energy.

The several stationary contacts of the remote control box 42 are connected as follows:

The stationary contact 40 is connected to the movable contact arm 30.

The stationary contact 41 is connected to the movable contact arm 37.

The stationary contacts 38 and 39, which are engageable by the movable contact arm 37 are connected to the electrical leads extending from the motor terminals 33 and 34 respectively.

The stationary contact 44c is connected to a stationary contact 31 and also in parallel to the lead extending from the motor terminal 33. The stationary contact 32 is connected to a stationary contact 52 and in parallel to the lead extending from the motor terminal 34. The stationary contact 51 is connected directly to the lead extending from the motor terminal 33.

The stationary contact 45c is connected with the movable contact arm 49, which is actuated by the contact pin 50 and is engageable with stationary contacts 51 and 52.

The operation for changing a slide, starting when a slide is in the projecting position is as follows:

After the main switch 46 (see FIGURE 6) has made contact the motor current flows via the contacts 45a, 45b, 44a, 44b, 43, 47, 25, 27 and the connecting wire represented by the dash-dotted line to the motor terminal 34.

The motor now turns in the direction of the dash-dotted arrow, but clutch remains disengaged when rotated in this direction in the following manner:

If motor 2 turns in the direction of the dash-dotted arrow, i.e. counter-clockwise, shaft 3 and worm gear 4 (see FIGURE 1) also turn counter-clockwise. As worm gear 4 engages the transmission gear 9, and as gear 9 meshes with gear 10a mounted on disc 10, the latter is also turned counter-clockwise. During such counter-clockwise rotation of disc 10, the balls 11b are free to rotate in the widened portion of recesses 11a in disc 10, and consequently no movement is transmitted to disc 12 and the latter remains stationary.

By pressing the control button 44 of the remote control switch 42 the contacts 44a, c, are closed for a brief period. As a result, current is supplied to the terminal 33 via the wire represented by the dashed line. Consequently, the polarity of the motor is reversed and the motor now turns in the opposite, clockwise direction, as indicated by the dashed arrow. At this moment the disc 12 is moved in clockwise direction and at the very start of its rotation the cam 24 releases the spring influenced contact tongue 25, thereby closing the contacts 25, 26.

Although the contact spring 44a will return to its previous position upon releasing the button 44, the motor continues to revolve, since the contact 26 is connected to the motor terminal 33 and the circuit is closed via the contacts 43, 47. The disc 12, which continues to be turned in the direction of the arrow (see FIGURE 6), drives the lever 16 via the peg 15. The latter is connected via the lever 19 with the slide carrier 20 and removes the same with the slide 22 from the viewing window.

In the meantime, the control member 56 of the disc 12 has come within the range of the stepping wheel 63 of the step switching gear. Since the spring 61 is weak compared to the force necessary to move the stepping wheel 63, the control member 56 will be pivoted by the wheel 63 against the influence of the spring.

Immediately thereafter the second control member 55 comes into mesh with the stepping wheel 63 but is retained against the stop 59 by the spring 58; due to the curved guide 67 the stepping wheel 63 is advanced by one step.

The gear 65 coupled with the stepping wheel 63 (see FIGURE 1) is drivingly engaged with the rack of the magazine 23 to move the magazine to place the succeeding slide in position. A further rotation of disc 12 releases the control member 55 from engagement with the stepping wheel 63.

The lever 19 is now pivoted in the opposite direction and a new slide is advanced to the viewing window. This movement is stopped as soon as the cam 24 hits against the spring tongue 25 i.e. as soon as the direction of rotation of the motor is reversed.

The magazine is advanced without introducing a new slide in the following manner:

If one slide is still in the viewing position (see FIGURES 1 and 6) the slide must first be moved back to the magazine. This is done by closing the switch 43 against the contact 40. The motor, which has been running in the direction of the dash-dotted arrow, is now reversed in polarity and turns in the direction of the dashed arrow, i.e. clockwise. The shaft 3 with worm gear 4 also turns clockwise, and this movement is transmitted via gear 9 and gear 10a to disc 10, so that the latter also turns clockwise. During such clockwise rotation of disc 10 the balls 11b are displaced in the narrow portion of recesses 11a and are clamped so as to be prevented from rolling, thereby effecting a driving engagement between discs 10 and 12. Consequently disc 12 also turns in clockwise direction, and after a rotation of about 180 degrees, i.e. at a time where the slide has been moved back to the magazine, the locking member 13 hits against the rim 54c of the control segment 53 and is held within one of the recesses 14 thereby putting out of operation the clutch 11.

In the meantime, the contact cam 24 has touched the cam follower 29a of the switch arm 29, thereby actuating the same, however, without any consequence as the contact 41 is open.

In the same manner as described further above, the control member 56 moves against the influence of the spring 61, whereas the second control member 55 advances the stepping wheel 63 by one step. Immediately thereafter, the cam 24 touches the cam follower 28a after the portion 24a has moved the switch balance into the requisite position and the cam pivots the cam follower 28a to actuate the spring contact 30 so as to close contact 32.

As a consequence, the direction of rotation of the motor is again reversed and the discs 10 and 12 turn in the direction of the dash-dotted arrow. The disc 12 is caused to rotate because the locking member 13 is still within the effective range 54a of the control segment 53 and effects the coupling between discs 12 and 10 by projecting into one of the recesses 14. During the return motion this stepping wheel 63 enters the guide way 67 of the control member 55, however, without being moved moving the step gear, as the control member 55 moves against its spring 58. After the control member has left the effective range of the stepping wheel 63, the cam 24 hits against the cam follower 28b of the switch arm 28, thereby pivoting back the latter. As a result, the contacts 30, 31 are connected with each other and the sense of rotation of the discs 10, 12 is again reversed.

This process is repeated as long as the contacts 40, 43 are closed and the magazine is continuously advanced step by step.

If the magazine is desired to be moved into the opposite direction, the contact 41 is engaged by the switch 43 instead of the contact 40.

In that case the switch arm 29 and the control member 56 come into play. The locking member 13 slides continuously along the cam surface 54c of the locking segment 53, until the movement is interrupted by opening the contacts 43, 41.

By this way the disc 12 and its peg 15 execute an oscillating movement. This movement causes a small lifting of the lever 16, which however by means of the slot 17a in the lever 17 will not be transmitted to the lever 19.

It is thus possible to so control the movement of the magazine that each slide can be projected at the desired moment and in the desired sequence, even if it had been shown previously.

If a slide is to be removed from the viewing position without movement of the magazine, the operation is as follows:

Upon switching the control switch 45 to connect stationary contact 45c, the motor turns in the direction of the dashed arrow and the disc 12 is driven.

The current flows through the contacts 49 and 51. The disc 12 connected with the slide 20 via the elements 15 through 19 removes the slide from the viewing position.

After a rotation of approximately 180 degrees, the cam 24 hits against the contact pin 50 and pushes the same back. Thereby the contact arm 49 is closed against the contact 52 and the rotation of disc 12 is stopped.

During this operation the control member 56 has moved against its spring 61 and has not actuated the stepping gear 63.

In addition, the cam 24 has pivoted the switch arm 29 without causing any reversal of polarity, since its connection to the current source is interrupted at the open contact 41, with the movable contact arm 43 being located in its initial position in engagement with stationary contact 47.

In the position where the cam 24 presses against the pin 50, the locking member 13 is located between the control cam surfaces 54a and 54b of the control segment 53. This cam surface 54b of the segment 53 releases the locking member 13 from one of the recesses 14 thereby disconnecting the discs 10 and 12 from each other.

The disc 12 then remains in this position. If in this position the slide has to be exchanged for another one, the control button 44 is actuated and thereby the same movements are initiated, however, with the first part of the entire slide changing operation having already been completed.

It will be understood that this invention is susceptible to modification in order to adapt it to different usages and conditions, and, accordingly, it is desired to comprehend such modifications within this invention as may fall within the scope of the appended claims.

What I claim is:

1. In a slide projector, the combinatoin of a reversible motor, cooling means for said projector, a magazine for slides and movable in both directions, means for advancing said magazine in either of said both directions, slide changing means for removing and returning slides to and from said magazine, and clutch means for drivingly connecting said slide changing means and said magazine advancing means to said reversible motor, said motor driving said slide changing means and magazine advancing means as well as said cooling means, said clutch means comprising a driving disc and a driven disc with said driven disc being driven in only one direction, means comprising a linkage system for interconnecting said driven disc and said slide removing and returning means, means for drivingly interconnecting said driven disc and said magazine advancing means, said slide removing and returning means being operable only when said motor rotates in one of its two directions of rotation but said cooling means being operable when said motor rotates in either direction of rotation.

2. In a slide projector, the combination of a reversible motor, cooling means for said projector, a magazine for slides and movable in both directions, slide changing means for removing and returning slides to and from said magazine, clutch means comprising a driving disc drivingly connected to said motor and a driven disc with said driven disc being driven in one direction, a pair of control members pivotally monuted on said driven disc and having cam grooves therein, a stepping wheel engageable with said cam grooves, means for advancing said magazine and comprising a stepping gear operable by said stepping wheel and drivingly connected to said magazine to move the same, and a linkage system drivingly interconnecting said driven disc and said slide changing means whereby rotation of said driven disc will actuate said slide changing means, said motor driving said slide changing means and magazine advancing means, as well as said cooling means.

3. In a slide projector, the combination of a reversible motor, cooling means for said projector, a magazine for slides and movable in both directions, slide changing means for removing and returning slides to and from said magazine, clutch means comprising a driving disc drivingly connected to said motor and a driven disc with said driven disc being driven in one direction, a pair of control members pivotally mounted on said driven disc and having cam grooves therein, a stepping wheel engageable with said cam grooves, means for advancing said magazine and comprising a stepping gear operable by said stepping wheel and drivingly connected to said magazine to move the same, a linkage system drivingly interconnecting said driven disc and said slide changing means whereby rotation of said driven disc will actuate said slide changing means, said motor driving said slide changing means and magazine advancing means, as well as said cooling means, a pair of switch contacts in the motor control circuit for reversing the polarity of the motor, and a cam on said driven disc engageable with said switch contacts for actuating the same.

4. In a slide projector, the combination of a reversible motor, cooling means for said projector, a magazine for slides and movable in both directions, slide changing means for removing and returning slides to and from said magazine, clutch means comprising a driving disc drivingly connected to said motor and a driven disc with said driven disc being driven in one direction, a pair of control members pivotally mounted on said driven disc and having cam grooves therein, a stepping wheel engageable with said cam grooves, means for advancing said magazine and comprising a stepping gear operable by said stepping wheel and drivingly connected to said magazine to move the same, a linkage system drivingly interconnecting said driven disc and said slide changing means whereby rotation of said driven disc will actuate said slide changing means, said motor driving said slide changing means and magazine advancing means, as well as said cooling means, a fixed control segment having a plurality of cam surfaces thereon spaced from the periphery of said driven disc, and means on said driven disc for lockingly engaging said driven and driving discs with said locking means being actuated by the cam surfaces on said control segment thereby enabling said magazine to be moved in either forward or backward direction while disengaging one of said control members from operation.

5. In a slide projector, the combination of a reversible motor, cooling means for said projector, a magazine for slides and movable in both directions, slide changing means for removing and returning slides to and from said magazine, clutch means comprising a driving disc drivingly connected to said motor and a driven disc with said driven disc being driven in one direction, a pair of control members pivotally mounted on said driven disc and having cam grooves therein, a stepping wheel engageable with said cam grooves, means for advancing said magazine and comprising a stepping gear operable by said stepping wheel and drivingly connected to said magazine to move the same, a linkage system drivingly interconnecting said driven disc and said slide changing means whereby rotation of said driven disc will actuate said slide changing means, said motor driving said slide changing means and magazine advancing means, as well as said cooling means, a fixed control segment having a plurality of cam surfaces thereon spaced from the periphery of said driven disc, and means on said driven disc for lockingly engaging said driven and driving discs with said locking means being actuated by the cam surfaces on said control segment thereby enabling said magazine to be moved in either forward or backward direction while disengaging one of said control members from operation, there being a plurality of recesses on the outer periphery of said driving disc to receive said locking means, said locking means entering one of said recesses at a predetermined relative position of said driving and driven discs thereby positioning said discs in a fixed position relative to each other.

6. In a slide projector, the combination of a reversible motor, cooling means for said projector, a magazine for slides and movable in both directions, slide changing means for removing and returning slides to and from said magazine, clutch means comprising a driving disc drivingly connected to said motor and a driven disc with said driven disc being driven in only one direction, means comprising a linkage system for interconnecting said driven disc and said slide removing and returning means, said slide removing and returning means being operable only when said motor rotates in one of its two directions of rotation but said cooling means being operable when said motor rotates in either direction of rotation, a pair of control members pivotally mounted on said driven disc and circumferentially spaced from each other, said control members each having curved cam grooves therein, a stepping wheel engageable with said cam grooves, means for advancing said magazine and comprising a stepping gear operable by said stepping wheel and drivingly connected to said magazine to move the same, and spring means for resiliently mounting said control members on said driven disc so that said control members can be idly moved by engagement with said stepping wheel in one direction of movement, said motor driving said slide changing means and magazine advancing means, as well as said cooling means.

7. In a slide projector, the combination of a reversible motor, cooling means for said projector, a magazine for slides and movable in both directions, slide changing means for removing and returning slides to and from said magazine, clutch means comprising a driving disc drivingly connected to said motor and a driven disc with said driven disc being driven in only one direction, means comprising a linkage system for interconnecting said driven disc and said slide removing and returning means, said slide removing and returning means being operable only when said motor rotates in one of its two directions of rotation but said cooling means being operable when said motor rotates in either direction of rotation, a pair of control members pivotally mounted on said driven disc and circumferentially spaced from each other, said control members each having curved cam grooves therein, a stepping wheel engageable with said cam grooves, means for advancing said magazine and comprising a stepping gear operable by said stepping wheel and drivingly connected to said magazine to move the same, said motor driving said slide changing means and magazine advancing means, as well as said cooling means, spring means for resiliently mounting said control members on said driven disc so that said control members can be idly moved by engagement with said stopping wheel in one direction of movement, a fixed control segment having a plurality of cam surfaces therein spaced from the periphery of said driven disc, means on said driven disc for lockingly engaging said driven and driving discs with said locking means being actuated by said control segment, there being a plurality of recesses on said driving disc to receive said locking means so as to lock said discs in fixed position relative to each other, said locking member projecting into the center cam surface of said fixed control segment in the position in which said stepping gear is locked by the said pair of control members.

8. In a slide projector, the combination of a reversible motor, cooling means for said projector, a magazine for slides and movable in both directions, slide changing means for removing and returning slides to and from said magazine, clutch means comprising a driving disc drivingly connected to said motor and a driven disc with said driven disc being driven in one direction, a pair of control members pivotally mounted on said driven disc and having cam grooves therein, a stepping wheel engageable with said cam grooves, means for advancing said magazine and comprising a stepping gear operable by said stepping wheel and drivingly connected to said magazine to move the same, a linkage system drivingly interconnecting said driven disc and said slide changing means whereby rotation of said driven disc will actuate said slide changing means, said motor driving said slide changing means and magazine advancing means, as well as said cooling means, a fixed control segment having a plurality of cam surfaces thereon spaced from the periphery of said driven disc, and means on said driven disc for lockingly engaging said driven and driving discs with said locking means being actuated by the cam surfaces on said control segment thereby enabling said magazine to be moved in either forward or backward direction while disengaging one of said control members from operation, said cam surfaces comprising a central cam surface and adjacent cam surface on both sides thereof on said control segment, the two adjacent cam surfaces each subtending an angle from the rational center of the driven disc which is greater than the angle subtended by each of said control members.

9. In a slide projector, as claimed in claim 8, with the end of said control segment disposed in the direction of rotation of said driven disc when disengaged from said clutch and the connecting portions between said cam surfaces being sloped with respect to the periphery of the driven disc.

10. In a slide projector, the combination of a reversible motor, cooling means for said projector, a magazine for slides and movable in both directions, slide changing means for removing and returning slides to and from said magazine, clutch means comprising a driving disc drivingly connected to said motor and a driven disc with said driven disc being driven in only one direction, means comprising a linkage system for interconnecting said driven disc and said slide removing and returning means, said slide removing and returning means being operable only when said motor rotates in one of its two directions of rotation but said cooling means being operable when said motor rotates in either direction of rotation, a pair of control members pivotally mounted on said driven disc and circumferentially spaced from each other, said control members each having curved cam grooves therein, a stepping wheel engageable with said cam grooves, means for advancing said magazine and comprising a stepping gear operable by said stepping wheel and drivingly connected to said magazine to move the same, spring means for resiliently mounting said control members on said driven disc so that said control members can be idly moved by engagement with said stepping wheel in one direction of movement, said motor driving said slide changing means and magazine advancing means, as well as said cooling means, a fixed control segment having a plurality of cam surfaces therein spaced from the periphery of said driven disc, means on said driven disc for lockingly engaging said driven and driving discs with said locking means being actuated by said control segment, there being a plurality of recesses on said driving disc to receive said locking means so as to lock said discs in fixed position relative to each other, said locking member projecting into the center cam surface of said fixed control segment in the position in which said stepping gear is locked by the said pair of control members, a pair of pivotally mounted contact arms with each arm having cam followers on the ends thereof, the angle subtended by each contact arm from the rotational center of said driven disc being less than the angle similarly subtended by the cam surface of the control segment which actuates the locking member but greater than the angle similarly subtended by each of said resiliently mounted control members, and a cam projecting from said driven disc and engageable with said cam followers to actuate the same.

11. In a slide projector, the combination of a reversible motor, cooling means for said projector, a magazine for slides and movable in both directions, slide changing means for removing and returning slides to and from said magazine, clutch means comprising a driving disc drivingly connected to said motor and a driven disc with said driven disc being driven in only one direction, means comprising a linkage system for interconnecting said driven disc and said slide removing and returning means, said slide removing and returning means being operable only when said motor rotates in one of its two directions of rotation but said cooling means being operable when said motor rotates in either direction of rotation, a pair of control members pivotally mounted on said driven disc and circumferentially spaced from each other, said control members each having curved cam grooves therein, a stepping wheel engageable with said cam grooves, means for advancing said magazine and comprising a stepping gear operable by said stepping wheel and drivingly connected to said magazine to move the same, spring means for resiliently mounting said control members on said driven disc so that said control members can be idly moved by engagement with said stepping wheel in one direction of movement, said motor driving said slide changing means and magazine advancing means, as well as said cooling means, and a contact pin positioned in the path of the cam mounted on said driven disc and in that area of the central cam surface of said fixed control segment in actuating said locking member, said contact pin being connected to the control circuit of the motor so as to cause said motor to rotate in the direction wherein said driven disc is disengaged from said clutch.

References Cited in the file of this patent

UNITED STATES PATENTS

| | | |
|---|---|---|
| 2,286,322 | Warriner | June 16, 1942 |
| 2,401,506 | Pechkranz | June 4, 1946 |
| 2,590,492 | Bennett et al. | Mar. 25, 1952 |
| 2,748,653 | Pollan et al. | June 5, 1956 |
| 2,874,497 | Huff et al. | Feb. 24, 1959 |